UNITED STATES PATENT OFFICE.

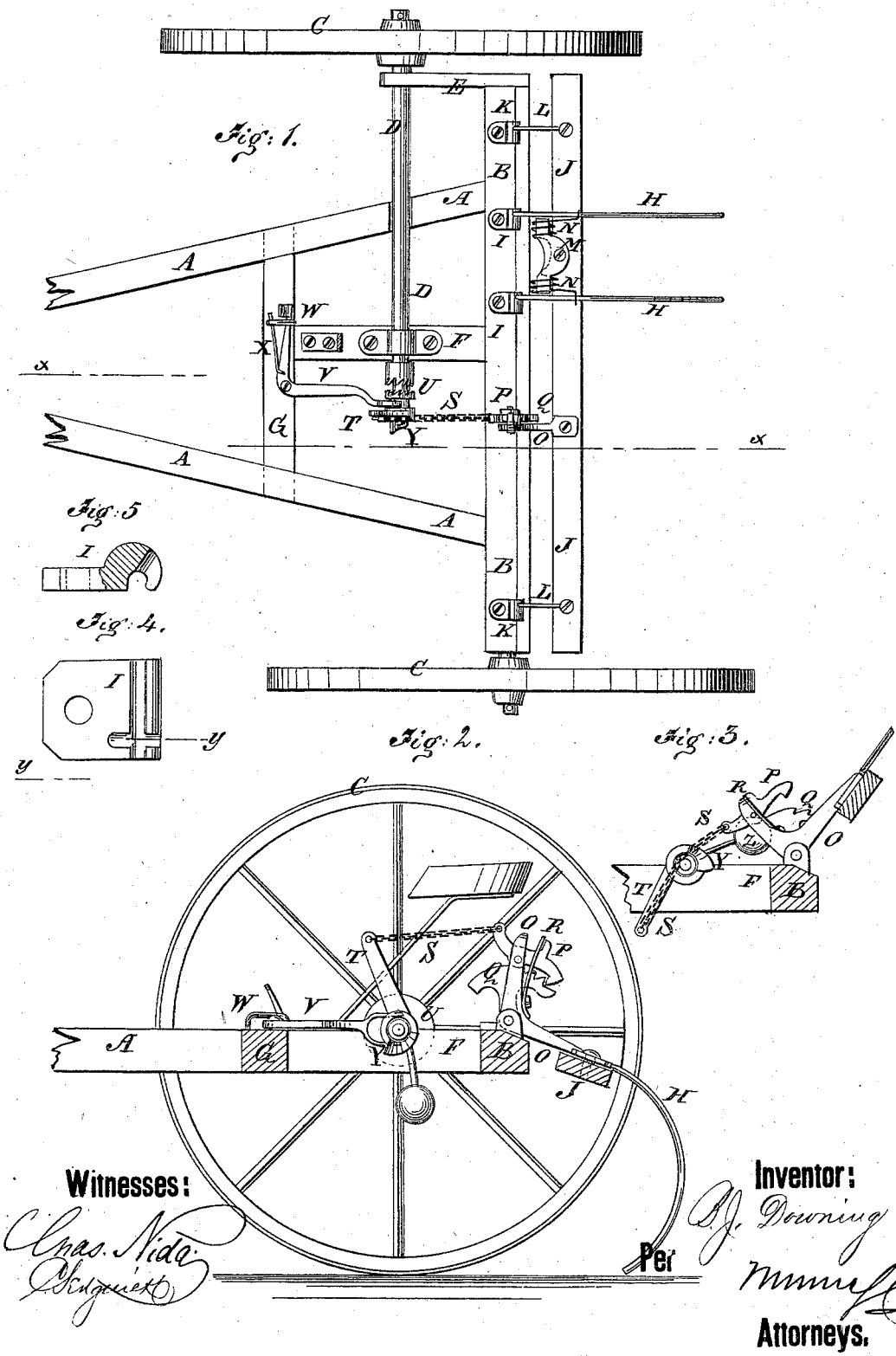

BURTON J. DOWNING, OF MITCHELL, IOWA.

IMPROVEMENT IN HORSE HAY-RAKES.

Specification forming part of Letters Patent No. 143,278, dated September 30, 1873; application filed July 19, 1873.

*To all whom it may concern:*

Be it known that I, BURTON J. DOWNING, of Mitchell, in the county of Mitchell and State of Iowa, have invented a new and useful Improvement in Horse Hay-Rake, of which the following is a specification:

Figure 1 is a top view of my improved hay-rake. Fig. 2 is a vertical section of the same taken through the line $x\,x$, Fig. 1. Fig. 3 is a detail view of the device for raising the rake-teeth. Fig. 4 is a detail view of one of the hinges. Fig. 5 is a detail section of the same taken through the line $y\,y$, Fig. 4.

Similar letters of reference indicate corresponding parts.

My invention has for its object to furnish an improved horse hay-rake, which shall be so constructed that the teeth can be conveniently raised to dump the hay when desired by the advance of the machine. The invention consists in the construction and arrangement of devices for elevating the rake-teeth to effect the discharge of gathered hay, as hereinafter described.

A are the shafts, the rear ends of which are rigidly attached to the axle B. Upon one end of the axle B is formed or to it is attached a journal, upon which one of the wheels C revolves. The other wheel C is rigidly attached to an axle, D, which revolves in bearings in an arm, E, attached to the end of the axle B, and in bearings attached to a bar, F, one end of which is secured to the axle B, and the other end to the cross-bar G of the shafts A. H are the rake-teeth, which are curved in the ordinary manner, and the upper ends of which are bent at right angles, and are inserted in grooves in the plates I, which are secured to the axle B, and which thus hinge the teeth to the said axle. J is a bar placed in the rear of and parallel with the axle B, and which is hinged to the said axle B by grooved plates K, similar to the plates I, and by rods L, similar to the upper parts of the teeth H, and the lower or rear ends of which are secured to the said bar J. To the bar J, between the teeth H, is pivoted a short bar, M, to which are attached, and around the ends of which are coiled, wire-springs N, the ends of which are connected with the teeth H. This construction gives the teeth H the necessary play to enable them to pass obstructions. O is a bent lever, which is pivoted at its angle to the axle B, and the rear arm of which is secured to the bar J. To the other or upper arm of the lever O is pivoted a pawl, P, the engaging end of which takes hold of the teeth of a curved rack, Q, attached to the axle B at the side of the lever O, against which rack the said pawl is held by the spring R attached to the upper arm of the said lever O. To the other end of the lever-pawl P is attached the end of a short chain, S, the other end of which is attached to the end of an arm, T, rigidly attached to the movable part of the clutch U, which works loosely upon the end of the axle D, and the other part of which is rigidly attached to the said axle D. V is a bent lever, the rear end of which is forked, and rides in a groove in the movable part of the clutch U. The lever V is pivoted at its angle to the cross-bar G of the shafts A, and its other arm extends along said cross-bar G, where its movements are limited by a keeper, W, attached to said cross-bar G. The lever V is held in position to hold the movable part of the clutch U away from its stationary part by a spring, X. Upon the outer side of the movable part of the clutch U is formed an inclined projection, Y, to keep the chain S from catching upon the end of the axle D when the said part of the clutch U is revolved. The movable part of the clutch U is brought into proper position when released from the stationary part of said clutch, by a weight, Z, connected with the said movable part of the clutch upon the opposite side from the arm T.

By this construction, when a sufficient amount of hay has been collected by the teeth H, the driver with his foot pushes forward the end of the lever V, which throws the parts of the clutch U into gear, and the movable part of said clutch is carried around with the axle D. This draws the chain S forward, the first effect being to raise the pawl P from the rack Q. The second effect is to draw the upper arm of the lever O forward, which raises the rake-teeth and discharges the collected hay. The arm T makes a revolution at each discharge of gathered hay.

Having thus described my invention, I claim as new and desire to secure by Letters Patent—

1. The combination of bent lever O, pawl P, rack Q, spring R, and chain S, substantially as described, so that power applied to the chain first disengages the pawl and then raises the rack, as described and shown.

2. The combination of the bent lever O, pawl P, rack Q, spring R, chain S, arm T, clutch U, bent lever V, spring X, inclined projection Y, and weight Z, with the bar J and axles B and D, substantially as herein shown and described.

BURTON J. DOWNING.

Witnesses:
O. P. FRISBIE,
I. L. ELLIOTT.